Aug. 2, 1966     R. A. DELANEY ETAL     3,264,537
DECOUPLING CAPACITOR
Filed June 21, 1965     3 Sheets-Sheet 1
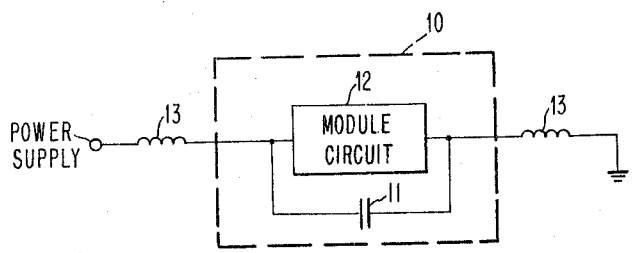
FIG. 1
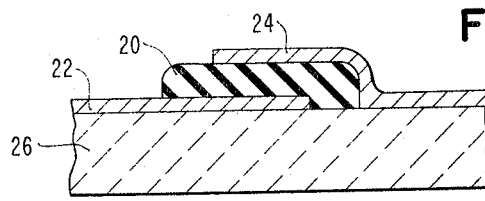
FIG. 2
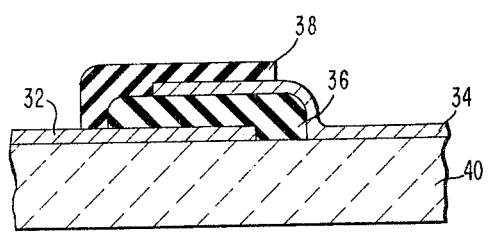
FIG. 3
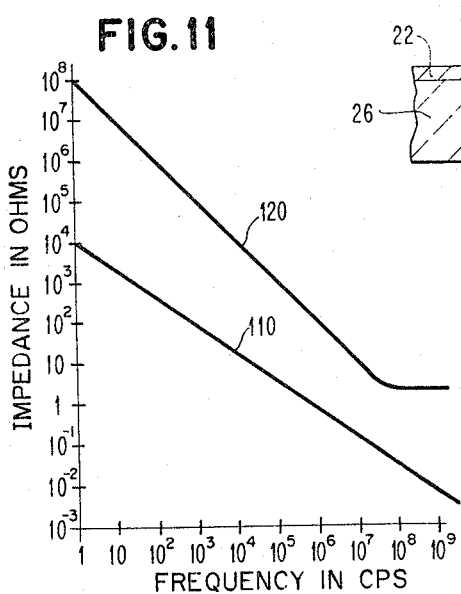
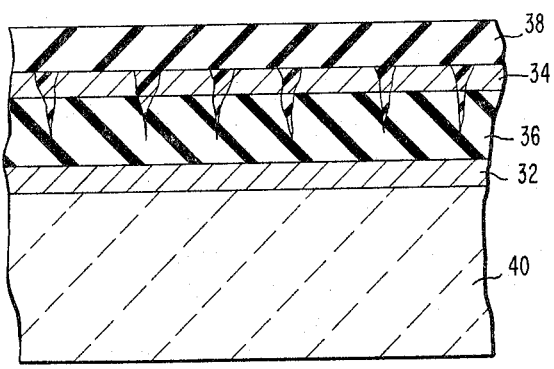
FIG. 4
INVENTORS
RONALD A. DELANEY
HAROLD D. KAISER
ARTHUR H. MONES
BY George O. Saile
ATTORNEY Aug. 2, 1966    R. A. DELANEY ETAL    3,264,537
DECOUPLING CAPACITOR
Filed June 21, 1965    3 Sheets-Sheet 2

FIG. 5

```
┌─────────────────────────────┐
│   PROVIDE FIRST ELECTRODE   │
│   ON DIELECTRIC SUBSTRATE   │
└──────────────┬──────────────┘
               │
               ▼
┌─────────────────────────────┐         ┌─────────────────────────────┐
│    DEPOSIT ZnO & Bi₂O₃      │         │    MIX Zn & Bi₂O₃ WITH      │
│   FIRST DIELECTRIC SUBLAYER │◄────────│     VEHICLE INTO A PASTE    │
│       OVER ELECTRODE        │         │                             │
└──────────────┬──────────────┘         └─────────────────────────────┘
               │
               ▼
┌─────────────────────────────┐
│        FIRE DEPOSIT AT      │
│   850°C TO 1100°C & QUENCH  │
└──────────────┬──────────────┘
               │
               ▼
┌─────────────────────────────┐
│     DEPOSIT ZnO & Bi₂O₃     │
│  SECOND DIELECTRIC SUBLAYER │◄────────┘
└──────────────┬──────────────┘
               │
               ▼
┌─────────────────────────────┐
│     DRY DEPOSIT AT 150°C    │
│        TO FORM INTERNAL     │
│       DIELECTRIC LAYER      │
└──────────────┬──────────────┘
               │
               ▼
┌─────────────────────────────┐     ┌──────────┐ ┌──────┐ ┌──────┐
│     PROVIDE SECOND ELECTRODE│     │MONOVALENT│ │ ZnO  │ │Bi₂O₃ │
│   OVER INTERNAL DIELECTRIC  │     │ DOPANT   │ │POWDER│ │POWDER│
│           LAYER             │     │ POWDER   │ │      │ │      │
└──────────────┬──────────────┘     └────┬─────┘ └───┬──┘ └──┬───┘
               │                         │           │       │
               ▼                         ▼           ▼       ▼
┌─────────────────────────────────┐   ┌─────────────────────────────┐
│  DEPOSIT ZnO, Bi₂O₃ & POSITIVE  │   │   MIX ZnO, Bi₂O₃ & DOPANT   │
│  MONOVALENT DOPANT EXTERNAL     │◄──│   WITH VEHICLE INTO A PASTE │
│DIELECTRIC LAYER OVER SECOND ELECTRODE│                             │
└──────────────┬──────────────────┘   └─────────────────────────────┘
               │
               ▼
┌─────────────────────────────┐
│     FIRE ASSEMBLEGE AT      │
│   850°C TO 1100°C & QUENCH  │
└─────────────────────────────┘
```

Aug. 2, 1966   R. A. DELANEY ETAL   3,264,537
DECOUPLING CAPACITOR
Filed June 21, 1965   3 Sheets-Sheet 3
FIG. 6a
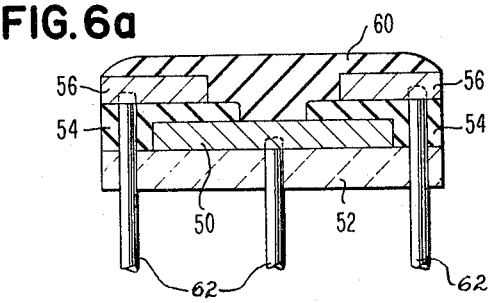
FIG. 6b
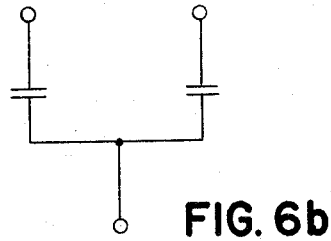
FIG. 7a
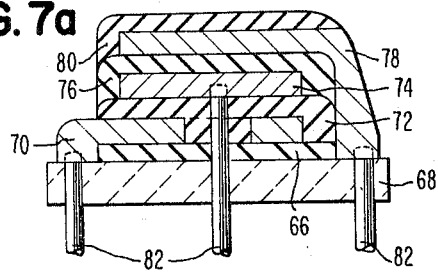
FIG. 7b
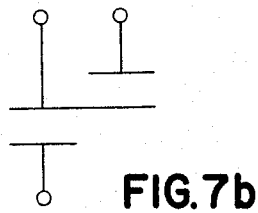
FIG. 8a
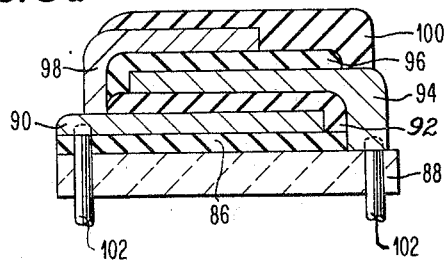
FIG. 8b
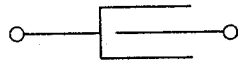
PRIOR ART
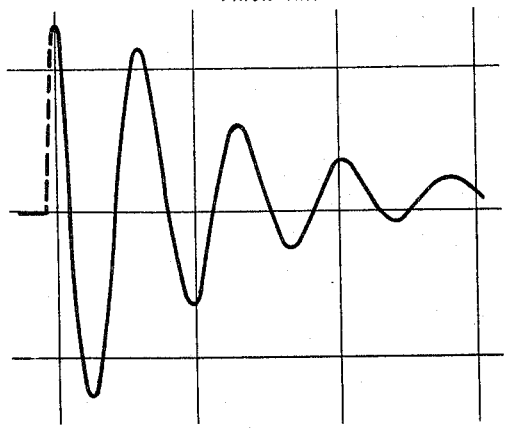
FIG. 9
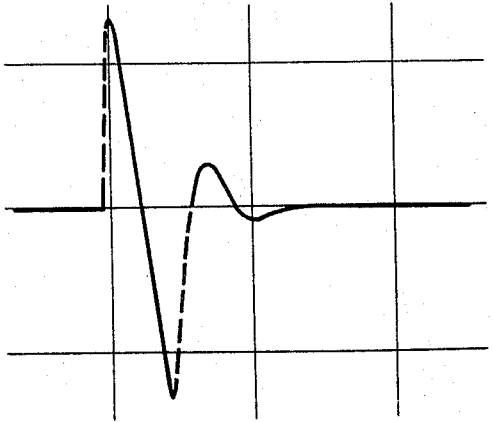
FIG. 10

3,264,537
DECOUPLING CAPACITOR

Ronald A. Delaney, Wappingers Falls, and Harold D. Kaiser and Arthur H. Mones, Poughkeepsie, N.Y., assignors to International Business Machines Corporation, Armonk, N.Y., a corporation of New York
Filed June 21, 1965, Ser. No. 465,329
16 Claims. (Cl. 317—258)

This invention relates to a high capacitance decoupling device and, more particularly, a capacitance device which is useful in microminiature electronic circuits.

Microminiature circuit modules used in digital computers have created a problem unique to such circuits. These high speed circuits are usually characterized by a low impedance which must be matched by low impedances in adjacent parts of the circuit. To apply appropriate voltage biases to a circuit module, a common power supply is coupled through the module to ground or to some other voltage source to provide the required low impedance. However, the power supply and ground are usually, electrically some distance from the module. Therefore, the modules often suffer the loss of their low impedance in the power supply to ground circuit because of the inductances of the conductor leads to the respective modules. Further, low impedance circuits with very fast switching times, such as tunnel diode circuits, can give rise to severe noise transients in the power supply circuit, leading to spurious signals which cause unwanted switching in other portions of the circuit located on the same module. This difficulty can be resolved by coupling the power supply circuit to ground with a suitable charge reservoir, that is, a capacitor, to lower the effective power supply impedance.

The use of a capacitor, however, presents additional problems. Large capacitances are desirable and the area usually available is quite limited in a microminiature electronic structure. More seriously, the capacitor, module lead inductance and power supply impedance form an inductive loop which tends to oscillate after a switching pulse is applied. This oscillation also leads to circuit malfunctions. The obvious solution to this problem is to introduce resistive loss into the circuit. However, if the resistive loss is placed in series with the capacitor, damping is achieved only at the expense of the low transient impedance of the capacitor. If the resistor is placed in parallel with the capacitor, excessive D.C. power dissipation in the resistor brings about a rise in module temperature as well as a waste of power.

The U.S. patent application Serial No. 360,323 filed April 16, 1964, entitled "High Capacitance Microelectronic Decoupling Device" and assigned to the assignee of the present patent application describes a high capacitance decoupling device for a microminiature electronic module that is of sufficiently small size to be compatible with its employment in a module. The patent application describes a capacitor having a dielectric material which is composed of a sintered mixture of zinc oxide and a P-type semiconductor oxide, such as bismuth trioxide, lead oxide, and copper oxide. The capacitive device described in the patent application has superior characteristics to anything known to the prior art. However, it has two serious drawbacks. The damping is in the 80 to 85 percent region, while damping of 98 percent or greater is most desirable. Further, to provide sufficiently high capacitance the D.C. resistance of the capacitor is lower than is desirable.

It is thus an object of this invention to provide an improved high capacitance decoupling capacitor device.

It is another object of this invention to provide a decoupling capacitor device that has critical damping characteristics at high switching frequencies in addition to a high D.C. resistance.

It is a further object of this invention to provide a method for fabricating a decoupling capacitor device having superior damping and high D.C. resistance characteristics.

It is a still further object of this invention to provide a dielectric composition composed of zinc oxide and bismuth trioxide and small quantities of positive monovalent dopants that is useful as a dielectric body in electric devices.

These and other objects are accomplished according to the broad aspects of the present invention by providing an electric device which includes a pair of electrodes with a dielectric body between the pair of electrodes. The dielectric body is composed of a sintered uniform mixture of finely divided particles of zinc oxide, bismuth trioxide and a positive monovalent dopant. The dielectric body preferably has about at least 94 percent by weight zinc oxide and no more than about 6 percent by weight of bismuth trioxide.

The preferred decoupling capacitor device includes a first and second conductive electrode with a first or internal dielectric layer between the electrodes and a second dielectric layer over one of the electrodes. The first dielectric layer which is between the two electrodes is composed of zinc oxide and bismuth trioxide. The second or external layer of dielectric material is composed of zinc oxide, bismuth trioxide and a positive monovalent dopant. The device is sintered at a temperature and for a time which causes the diffusion of quantities of the dopant through the portion of the electrode film in contact with the second dielectric layer and into portions of the grain boundaries of the first dielectric layer. It is this diffused dopant present in the grain boundaries of the first dielectric layer and in the portions of electrode film that produces the novel high D.C. resistance and superior damping characteristics of the present capacitor device.

The method for fabricating this type of device on a microminiature electronic module includes first providing on a dielectric substrate a conductive electrode. A first dielectric layer of zinc oxide and bismuth trioxide is then deposited over the first electrode and the layer is fired at an elevated temperature. After the first dielectric layer is quenched, a second conductive electrode is applied to the first dielectric layer. An external dielectric layer is then deposited over the second electrode. The external dielectric layer is composed of about at least 94 percent by weight zinc oxide, no more than about 6 percent by weight bismuth trioxide and a positive monovalent dopant. The assemblage is fired for a time and at a temperature that causes the dopant to diffuse through the second electrode and into the grain boundaries of the first dielectric layer.

The foregoing and other objects, features and advantages of the invention will be apparent from the following more particular description of the preferred embodiments of the invention as illustrated in the accompanying drawings.

In the drawings:

FIGURE 1 is a schematic representation of a power supply for a microminiature electronic module and a circuit thereon;

FIGURE 2 is a cross sectional view of the basic structure of a capacitor of the present invention;

FIGURE 3 is a cross sectional view of the improved and preferred structure of a capacitor of the present invention;

FIGURE 4 is a greatly enlarged schematic, cross sectional illustration of a portion of the preferred capacitor device shown in FIGURE 3;

FIGURE 5 is a flow chart illustrating the method for fabricating the capacitor device of FIGURES 3 and 4;

FIGURES 6a and 6b illustrate one structural form and its electrical equivalent that the improved capacitor of the present invention may take;

FIGURES 7a and 7b illustrate a second structural form and its electrical equivalent that the capacitor of the present invention may take;

FIGURES 8a and 8b illustrate a third structural form and its electrical equivalent that the capacitor of the present invention may take;

FIGURE 9 is a graphical illustration of the oscillator damping characteristics of the prior art capacitor;

FIGURE 10 is a graphical illustration of the oscillator damping characteristics of the present decoupling capacitor; and FIGURE 11 is a graphical illustration of the impedance vs. frequency characteristics of both the prior art and the present invention's capacitor.

Referring now, more particularly, to FIGURE 1 there is illustrated the power supply circuit for the microminiature electronic module 10 in which capacitor 11 has been placed parallel with module circuit 12 to prevent severe noise transients in the power supply to ground circuit 13 which may result in false signals and switching in other circuits connected to the module. As contemplated in the present invention and in the prior U.S. patent application referred to above, this capacitance is in the form of a high capacitance decoupling device wherein the dielectric material of the capacitor is characterized by a low A.C. resistivity to dampen oscillation in the power supply circuitry.

FIGURE 2 illustrates the basic invention wherein a dielectric body 20 is positioned between two electrodes, 22 and 24, on a dielectric substrate 26 by a series of coating and firing procedures. This decoupling capacitor uses about at least 94 percent by weight of zinc oxide, no more than about 6 percent by weight bismuth trioxide and a positive monovalent dopant of a concentration of between about 0.01 to 3.0 mol percent. The usable dopants include silver, lithium and copper. The preferred dopant is copper.

The presence of the monovalent dopant substantially increases the resistivity from approximately $1 \times 10^4$ ohm-cm. of the capacitor in the prior referred to patent application to about $1 \times 10^8$ ohm-cm. in the present invention. Further the Q value at one megacycle per second is increased ten fold from 0.1 to 1. The damping at ten megacycles is increased from about 80 percent to damping of greater than 98 percent. These improved characteristics, however, are made at a substantial decrease of the dielectric constant of the material, that is, from about 2000 in the above referred to patent application to 1000 at one megacycle per second and an increase in the complex impedance from a decreasing value of less than 1 ohm, as shown by curve 110 in FIGURE 11, to a constant value of between 2 to 3 ohms, as shown by curve 120 in FIGURE 11, in the frequency range 10–1000 megacycles per second.

The thin film capacitor may be fabricated on a dielectric substrate 26 by providing a first electrode 22 on the substrate 26 such as by silk screening a gold-platinum glass fluxed paste composition onto the substrate. The gold-platinum glass fluxed composition is fired at an elevated temperature. The particular temperature basically depends on the melting point of the flux used, but is generally on the order of 750° C. The dielectric material 20 is then applied in the form of a paste over the first electrode 22. The paste composition includes a finely divided mixture of zinc oxide and bismuth trioxide particles together with the monovalent dopant which may be brought into the mixture in the form of a salt such as copper nitrate, silver nitrate or lithium nitrate dispersed within a suitable vehicle. This dielectric layer is preferably applied in two sub-layers. The first sub-layer is applied and fired or sintered between about 850 and 1100° C. in a suitable furnace for approximately 10 minutes. After quenching, the second sub-layer is applied over the first layer and dried at 150° C. After drying, a second electrode film 24 is applied over the composite dielectric layer to form the capacitor of the present invention. The fabrication of the dielectric layer by means of the deposition of successive sub-layers does not contribute to the operating mechanism of the invention but is preferred to increase the reliability of the device. The second conductive layer is preferably the same composition as the first dielectric layer 22 and is applied by an identical method.

The preferred form of the invention is illustrated in FIGURES 3 and 4. The preferred capacitor form of the invention surprisingly has a dielectric constant of the order of 1500, that is 50 percent greater than the FIGURE 2 capacitor, while still having critical damping, high D.C. resistance and high Q characteristics. The capacitor device includes electrodes 32 and 34. Between the electrodes is a dielectric body or internal layer 36 composed of zinc oxide and bismuth trioxide. An external layer or second body 38 of dielectric composed of zinc oxide, bismuth trioxide and a positive monovalent dopant in the range of 0.01 to 3.0 mol percent is located over at least one of the two electrodes. During the fabrication process the monovalent dopant in the external dielectric layer 38 is caused to diffuse through the pores of the second electrode 34 into the grain boundaries of the dielectric body 36. This is preferably done by firing or sintering the assemblage at a temperature of about 850 to 1100° C. for a period of approximately 1 hour to diffuse the monovalent dopant from the dielectric layer 38 through the pores of the second electrode 34 and into the grain boundaries of the dielectric layer 36. The capacitor may be built upon a substrate 40 which will remain a part of the capacitor and support it. FIGURE 4 illustrates the diffusion of the monovalent dopant through the electrode layer into the grain boundaries of the first dielectric layer 36.

The preferred method of manufacturing the microminiature decoupling capacitor of the present invention is given in the flow diagram of FIGURE 5. A suitable dielectric substrate composed of a ceramic or glassy material is provided with a first electrode. The first electrode may be applied by any of the conventional procedures such as printing or other electrode deposition techniques. The electrode is then fired, if necessary. The zinc oxide powder and bismuth trioxide powder are independently ground to a small particle size by conventional grinding techniques, such as by a mortar and pestle, three roll mill or a ball mill. The grinding step with the mortar and pestle can have water or other non-reactive liquids added to the powders during grinding. Suitable quantities of the powders are intimately mixed in the dry state and then are uniformly blended with a suitable vehicle until a paste is formed. The vehicle is added in such quantities so that the solid contents of the paste is approximately 70 percent. One suitable vehicle is a combination of beta-terpineol and ethyl cellulose wherein the terpineol is approximately 90 percent of the vehicle. The first dielectric layer is preferably applied in two sublayers. The dielectric paste is applied over the first electrode by conventional printing techniques to form the first sublayer. The substrate with the electrodes and the dielectric sublayer is then sintered in a furnace at a temperature between about 850 to 1100° C. The dielectric sublayer is preferably quenched by a stream of a coolant gas onto the surface of the capacitor. Other quenching techniques are, of course, possible. A second dielectric sublayer is applied to the first dielectric sublayer and dried to complete the formation of the first or internal dielectric layer 36. The second electrode 34 is thereafter applied to the first dielectric layer in a similar manner as was the first electrode 32 applied to the dielectric substrate. The composition of the second electrode is preferably the same as that of the first electrode. If necessary, the second electrode is then fired. Zinc oxide, bismuth trioxide and a positive monovalent dopant powder in quantities of about 0.01 to 3.0 mol percent of the mixture are uniformly mixed as powders. The powders are then uniformly mixed with a vehicle such as described in making the first dielectric material into a paste. This paste is then printed over the second electrode to form an external or second dielectric layer 38. The assemblage is fired at a temperature of between about 850° to 1100° C. for a period of time between 30 and 80 minutes depending on the particular temperature used. At this temperature and during this time the monovalent dopant diffuses through the porous second electrode and into the grain boundaries of the dielectric body. The resulting capacitor is then removed from the furnace and again preferably quenched.

FIGURES 6a and 6b, FIGURES 7a and 7b and FIGURES 8a and 8b show various forms of multiple capacitors that may be made according to the method of the present invention. FIGURE 6a shows a split-parallel capacitor having a common plate electrode with its equivalent circuit illustrated in FIGURE 6a. The common plate electrode 50 is provided on substrate 25. The composite or internal dielectric body 54 which is made up of the first and second sublayers as described above covers the electrode 50. Electrodes 56 and 58 establish two capacitors. The external or second dielectric layer 60 is the layer containing the dopant which is diffused through electrodes 56 and 58 into the grain boundaries of layer 54. The electrodes are connected to input/output pins 62. FIGURE 7a shows a stacked parallel pair of capacitors with its equivalent circuit illustrated in FIGURE 7b. The external dielectric layer 66 is provided on substrate 68. The first electrode 70 is located over the layer 66. A second dielectric layer 72, which is preferably a composite of two sublayers, covers the electrode 70. Another electrode 74 is deposited over layer 72, followed by dielectric layer 76, electrode 78 and final dielectric layer 80. The layers 66 and 80 originally contained the dopants which are diffused into the grain boundaries of layers 72 and 76. The electrodes are connected to input/output pins 82. The center pin is insulated from electrode 70 by a hole in the electrode and dielectric material in the hole. FIGURE 8a shows a stacked parallel pair of capacitors with its equivalent circuit illustrated in FIGURE 8b. A dielectric layer 86 is deposited on substrate 88. Over layer 86 is deposited successively electrode 90, dielectric layer 92, electrode 94, dielectric layer 96, electrode 98 and dielectric layer 100. The dielectric layers 86 and 100 originally contained the dopants which are diffused into the grain boundaries of layers 92 and 96 through the electrodes 90 and 98. The electrodes are connected to input/output pins 102.

The composition of the dielectric is critical to obtain the desirable capacitor characteristics of high D.C. resistance and critical damping. The basic dielectric material of at least about 94 percent by weight zinc oxide and no more than about 6 percent by weight bismuth trioxide is required as explained in the prior U.S. patent application referred to above.

The preferred composition is 96 to 98 percent by weight zinc oxide and the remainder bismuth trioxide.

The FIGURES 9 and 10 show typical oscillation damping curves as viewed on an oscilloscope for, respectively, 80 percent damping and for critical damping of greater than 98 percent.

The following examples are included in order to aid in the understanding of the invention and variations may be made by one skilled in the art without departing from the spirit of the invention.

EXAMPLES 1 THROUGH 10

The semiconductor dielectric composition is composed in each of the first nine examples of 97 percent by weight of zinc oxide, 3 percent by weight bismuth trioxide and either silver, lithium or copper dopant in a concentration of 0.01 mol percent, 0.1 mol percent or 1.0 mol percent as indicated in the below Table I. The undoped Example 10 was run as a standard for comparison with the other nine examples. The zinc oxide, bismuth trioxide and dopant powders were weighed, mixed and blended into a paste with 30 percent by weight of a vehicle which included 94 percent beta-terpineol and 6 percent ethyl cellulose. The paste was initially dispersed for fifteen minutes in an automatic mortar and pestle and then dispersed through a three-roll mill until an aggregate particle size of about 0.3 mil was obtained on a standard grind gauge.

A series of 96 percent alumina substrates were thoroughly cleaned and dried. Bottom electrodes of a glass frit, gold-platinum paste composition were screened onto the substrate in the desired electrode pattern, dried and fired at 760° C. for twenty minutes to produce a fused gold-platinum electrode. The dielectric layer was made by successive application of two sublayers. The dielectric paste composition was screened over the fused electrode, dried at 150° C. for fifteen minutes, fired at 1000° C. for 10 minutes, and quenched by placing on an aluminum block to form the first sublayer. A second sublayer of the same dielectric composition was screened over the first layer and dried at 150° C. for fifteen minutes. The top electrode of the same gold-platinum composition as the bottom electrode was then silk screened over the composite dielectric layer, dried at 150° C. for 15 minutes and fired at 1000° C. for 50 minutes and quenched.

The capacitors of the different examples were given a series of standard tests which included measurement of the D.C. resistance, percent damping at five megacycles and the capacitance in nf./in.$^2$. The effective dielectric constant was calculated. The results of these standard tests are given in Table I.

TABLE I

| Example | Dopant in Mol percent | D.C. Resistivity (Ohm-cm.)×10$^6$ | Damping (percent) | Capacitance (Nf./in.$^2$) | Dielectric Constant |
| --- | --- | --- | --- | --- | --- |
| 1 | 0.01 Silver | 0.25 | 94 | 455 | 1,000 |
| 2 | 0.1 Silver | 0.50 | 90 | 400 | 1,350 |
| 3 | 1.0 Silver | 1.00 | 98 | 580 | 1,620 |
| 4 | 0.01 Lithium | 0.75 | 92 | 540 | 1,130 |
| 5 | 0.1 Lithium | 0.75 | 94 | 540 | 1,130 |
| 6 | 1.0 Lithium | 0.90 | 88 | 580 | 1,170 |
| 7 | 0.01 Copper | 1.00 | 90 | 395 | 1,240 |
| 8 | 0.1 Copper | 5.00 | 95 | 450 | 1,180 |
| 9 | 1.0 Copper | 15.00 | 98 | 450 | 1,200 |
| 10 | None | .025 | 80 | 700 | 2,000 |

It is seen from the results of these examples that capacitors having the desired characteristics of high D.C. resistance and near critical damping can be made using silver, lithium or copper dopant. The copper dopant is shown to be superior to silver and lithium in raising the D.C. resistivity.

EXAMPLES 11 THROUGH 17

The procedure for the preparation of the dielectric composition and for the fabrication of the capacitor device for this group of examples was identical to the Example 1 through 10 description. However, the dopant used was changed in each example as is given in the below Table II. The standard tests were again run on this series of capacitors and are given in the following Table II.

TABLE II

| Example | Dopant Material (1.0 mol percent) | D.C. Resistivity (ohm-cm.)×10$^6$ | Damping (percent at 5 Mc.) | Capacitance (Nf./in.$^2$) | Dielectric Constant | Q |
|---|---|---|---|---|---|---|
| 11 | Cu(NO$_3$)$_2$ | 10-25 | >98 | 300-350 | 600-700 | 1-1.2 |
| 12 | CuSnO$_3$ | 50-150 | >98 | 325-375 | 700-800 | 1.3-1.5 |
| 13 | Cu(NO$_3$)$_2$+TiO$_2$ | 1-5 | >98 | 325-375 | 700-800 | 1-1.2 |
| 14 | TiO$_2$ | .1-.5 | 80 | 350-400 | 1,000-1,100 | 40-45 |
| 15 | BaTiO$_3$ | .05-.1 | 80 | 400-450 | 800-900 | 35-40 |
| 16 | Cu Acetate | 5-10 | >98 | 350-400 | 900-1,000 | 1.3-1.5 |
| 17 | CuTiO$_3$ | 1-5 | >98 | 400-500 | 900-1,000 | 1-1.2 |

It is seen from the results tabulated in the table that the best overall capacitor was obtained using the 1 mol percent copper titanate as the source of dopant. Using the copper titanate the dielectric constant was of the order of 900 to 1000, critical damping was obtained and the D.C. resistance was quite high. Other copper salts showed poorer dielectric constant characteristics. The Examples 12, 13 and 14 using varying amounts of titanium dioxide or barium titanate were used to determine whether the doping is caused by the monovalent copper ion or the titanium dioxide. It can be seen from the results that Examples 14 and 15 produced inferior capacitors since the damping was less than the desired critical value and the Q values are much too high. Only in the Example 13 which contained the copper nitrate dopant in addition to the titanium dioxide was the superior capacitor obtained. The Example 13 compares almost exactly to Example 11 which had the same amount of copper nitrate present but did not contain the titanium dioxide. It is therefore seen that the titanate or titanium dioxide is not responsible for the damping or high D.C. resistance characteristics.

EXAMPLES 18 THROUGH 21

Two types of semiconductor dielectric materials were prepared for this series of examples. The first included 97 percent by weight zinc oxide, three percent by weight bismuth trioxide and a 1 mol percent of copper titanate. The second dielectric material included 97 percent by weight zinc oxide and 3 percent by weight bismuth trioxide. Each of these materials were separately weighed, mixed and blended into pastes with a 30 percent by weight vehicle which included 94 percent beta-terpineol and 6 percent ethyl cellulose. The pastes were initially dispersed for 15 minutes in an automatic mortar and pestle and then dispersed through a three-roll mill until an aggregate particle size of about 0.3 mil was obtained on a standard grind gauge.

The capacitor configuration in each of these examples was basically that of the FIGURE 3. The electrodes were applied, dried and fired in a manner described in the Examples 1 through 10. The difference being between the earlier examples and the present examples that an external dielectric layer was applied over the second electrode. In each case this dielectric layer was deposited by silk screening techniques, dried at 150° C. for 15 minutes and fired at 1000° C. for 50 minutes and quenched.

The examples are distinguished by the presence or absence of a dopant in the internal or external dielectric layer as given in Table III. Examples 20 and 21 are different in that the external layer in Example 20 fully covers the second electrode and touches large areas of the internal dielectric layer as illustrated in FIGURE 3 while the Example 21 has its external dielectric layer restricted to a small dot-shaped area which contacts only the second electrode and does not touch the internal dielectric material.

TABLE III

| Example | Dopant Present In— | | D.C. Resistance (ohm-cm.) | Damping (percent at 10 Mcps.) | Dielectric Constant (at 1 Mcps.) | Q (at 1 Mcps.) | Impedance (ohms) |
|---|---|---|---|---|---|---|---|
| | Internal Dielectric Layer | External Dielectric Layer | | | | | |
| 18 | No | No | 10$^4$ | 80 | 2,000 | 0.1-0.3 | <1 |
| 19 | Yes | Yes | 10$^8$ | >98 | 1,000 | 1-2 | 2-3 |
| 20 | No | Yes | 10$^8$ | >98 | 1,500 | 1-2 | 1-2 |
| 21 | No | Yes | 10$^8$ | >98 | 1,500 | 1-2 | 1-2 |

The standard tests were run on the completed capacitor. From the tests it is seen that the capacitors of Examples 20 and 21 which are the preferred capacitor structure of the present invention, had the superior capacitor characteristics. The Example 18 shows that the effect of no dopant in either dielectric layer is that the D.C. resistance is low, the Q is low, the damping is only 80 percent and the dielectric constant is high. Example 19 shows the effect of having dopants in the first and second dielectric layers. The Example 19 has excellent properties except for its unduly low dielectric constant and higher impedance. The surprising 50 percent increase in dielectric constant, as compared to the Example 19 capacitor, is shown in the Examples 20 and 21 wherein a dopant is present only in the external dielectric layer and not in the internal dielectric layer. No difference in properties were noted between Examples 20 and 21 so the touching of the first and second dielectric layers is of minor importance.

While this invention has been particularly shown and described with reference to the preferred embodiments thereof, it will be understood by those skilled in the art that various changes in form and details may be made therein without departing from the spirit and scope of the invention.

What is claimed is:
1. An electric device comprising:
a pair of electrodes;
a dielectric body between said pair of electrodes;
said dielectric body being composed of a sintered uniform mixture of finely divided particles of about at least 94 percent by weight zinc oxide, no more than about 6 percent by weight bismuth trioxide and a positive monovalent dopant.
2. The electric device of claim 1 wherein the dopant is silver.

3. The electric device of claim 1 wherein the dopant is lithium.

4. An electric device comprising:
a pair of electrodes;
a dielectric body between said pair of electrodes;
said dielectric body being composed of a sintered uniform mixture of finely divided particles of about at least 94 percent by weight zinc oxide, no more than about 6 percent by weight bismuth trioxide and between about 0.01 to 3.0 mol percent of monovalent copper ion dopant.

5. An electric device comprising:
a pair of electrodes;
a dielectric body between said pairs of electrodes;
said dielectric body being composed of a sintered uniform mixture of finely divided particles of between about 96 to 98 percent by weight zinc oxide, between about 4 to 2 percent by weight bismuth oxide and between about 0.01 to 3.0 mol percent of monovalent copper ion dopant.

6. A dielectric body having electrodes attached thereto, said body comprising:
a sintered uniform mixture of finely divided particles;
said mixture being composed of about at least 94 percent by weight zinc oxide, no more than about 6 percent by weight bismuth trioxide and a positive monovalent dopant.

7. A dielectric body having electrodes attached thereto, said body comprising:
a sintered uniform mixture of finely divided particles;
said mixture being composed of about at least 94 percent by weight zinc oxide, no more than about 6 percent by weight bismuth trioxide and 0.1 to 3.0 mol percent of monovalent copper ion dopant.

8. A high D.C. impedance device comprising:
first and second electrode films;
an internal layer of dielectric material secured between said electrodes, said material including about at least 94 percent by weight zinc oxide and no more than about 6 percent by weight bismuth trioxide;
an external layer of dielectric material in contact with one of said electrode films, said material including about, at least 94 percent by weight zinc oxide, no more than about 6 percent by weight bismuth trioxide and a positive monovalent dopant; and
diffused quantities of said dopant through the portion of the said electrode film in contact with said external layer and in portions of the grain boundaries of said internal layer.

9. The high D.C. impedance device of claim 8 wherein the dopant is silver.

10. The high D.C. impedance device of claim 8 wherein the dopant is lithium.

11. A high D.C. impedance capacitor device comprising:
first and second electrode films;
an internal layer of dielectric material secured between said electrodes, said material including about at least 94 percent by weight zinc oxide and no more than about 6 percent by weight bismuth trioxide;
an external layer of dielectric material in contact with one of said electrode films, said material including about, at least 94 percent by weight zinc oxide, no more than about 6 percent by weight bismuth trioxide and between about 0.01 to 3.0 mol percent of monovalent copper ion dopant; and
diffused quantities of said dopant through the portion of the said electrode film in contact with said external layer and in portions of the grain boundaries of said internal layer.

12. A high D.C. impedance capacitor device comprising:
first and second electrode films;
an internal layer of dielectric material secured between said electrodes, said material including between about 96 to 98 percent by weight zinc oxide and between about 4 to 2 percent by weight bismuth trioxide;
an external layer of dielectric material in contact with one of said electrode films, said material including between about 96 to 98 percent by weight zinc oxide, between about 4 and 2 percent by weight bismuth trioxide and 0.01 to 3.0 mol percent of monovalent copper ion dopant; and
diffused quantities of said dopant through the portion of the said electrode film in contact with said external layer and in portions of the grain boundaries of the said internal layer.

13. An electric device comprising:
a pair of electrodes;
an internal dielectric body between said pair of electrodes; said body being composed of about at least 94 percent by weight zinc oxide, no more than about 6 percent by weight bismuth trioxide and having a positive monovalent dopant diffused within its grain boundaries;
an external dielectric body over at least one of said pair of electrodes, said body being composed of about at least 94 percent by weight zinc oxide, no more than about 6 percent by weight bismuth trioxide and a positive monovalent dopant; and
said internal body having said dopant diffused into its grain boundaries from said external body by firing the assemblage for a time and at a temperature that causes said dopant from said external body to diffuse through said one of said pair of electrodes and into the grain boundaries of said internal body.

14. An electric device comprising:
a pair of electrodes;
an internal dielectric body between said pair of electrodes; said body being composed of about at least 94 percent by weight zinc oxide, no more than about 6 percent by weight bismuth trioxide and having a monovalent copper ion dopant diffused within its grain boundaries;
an external dielectric body over at least one of said pair of electrodes, said body being composed of about at least 94 percent by weight zinc oxide, no more than about 6 percent by weight bismuth trioxide and a monovalent copper ion dopant; and
said internal body having said dopant diffused into its grain boundaries from said external body by firing the assemblage between about 30 to 80 minutes and between about 850° and 1100° C. to diffuse said dopant from said external body through said one of said pair of electrodes and into the grain boundaries of said internal body.

15. A method for fabricating a high impedance capacitor device comprising:
providing on a dielectric substrate a first conductive electrode;
depositing a composite dielectric sub-layer over said first electrode and firing said layer at an elevated temperature, said sub-layer being composed of about, at least 94 percent by weight zinc oxide and no more than about 6 percent by weight bismuth trioxide;
depositing a second dielectric sub-layer over said first dielectric sub-layer and drying to form an internal dielectric layer, said second sub-layer being composed of about, at least 94 percent by weight zinc oxide and no more than about 6 percent by weight bismuth trioxide;
providing a second conductive electrode over said internal dielectric layer;
depositing an external dielectric layer over said second electrode; said layer being composed of about, at least 94 percent by weight zinc oxide, no more than about 6 percent by weight bismuth trioxide and a positive monovalent dopant; and
firing the assemblage for a time and at a temperature that causes said dopant to diffuse from said external dielectric layer through said second electrode and into the grain boundaries of said internal dielectric layer to thereby provide an improved capacitor device having high D.C. impedance and superior damping characteristics.

16. A method for fabricating a high impedance capacitor device comprising:

providing on a dielectric substrate a first conductive electrode;

depositing a first dielectric sub-layer over said first electrode and firing said layer at an elevated temperature, said sub-layer being composed of about, at least 94 percent by weight zinc oxide and no more than about 6 percent by weight bismuth trioxide;

depositing a second dielectric sub-layer over said first dielectric sub-layer and drying to form an internal dielectric layer, said second sub-layer being composed of about, at least 94 percent by weight zinc oxide and no more than about 6 percent by weight bismuth trioxide;

providing a second conductive electrode over said internal dielectric layer;

depositing an external dielectric layer over said second electrode; said layer being composed of about, at least 94 percent by weight zinc oxide, no more than about 6 percent by weight bismuth trioxide and a positive monovalent dopant; and firing the assemblage between about 30 to 80 minutes and between about 850° C. and 1100° C. to diffuse said dopant from said external layer, through said second electrode and into the grain boundaries of said internal dielectric layer to thereby provide an improved capacitor device having high D.C. impedance and superior damping characteristics.

References Cited by the Examiner

UNITED STATES PATENTS 3,154,503  10/1964  Janakirma-Rao _____ 252—514

OTHER REFERENCES

Kosman and Geese: In Academy of Sciences USSR: Physical Series Bulletin, vol. 22 (1958), pp. 312–215.

LARAMIE E. ASKIN, *Primary Examiner.*

E. GOLDBERG, *Assistant Examiner.*